US008875726B2

(12) United States Patent
Laible

(10) Patent No.: US 8,875,726 B2
(45) Date of Patent: Nov. 4, 2014

(54) APPARATUS FOR RINSING CHEMICAL CONTAINERS

(71) Applicant: Rodney Laible, Omaha, NE (US)

(72) Inventor: Rodney Laible, Omaha, NE (US)

( * ) Notice: Subject to any disclaimer, the term of this patent is extended or adjusted under 35 U.S.C. 154(b) by 220 days.

(21) Appl. No.: 13/646,950

(22) Filed: Oct. 8, 2012

(65) Prior Publication Data

US 2014/0096828 A1 Apr. 10, 2014

(51) Int. Cl.
*F16K 21/04* (2006.01)

(52) U.S. Cl.
USPC ........................................ 137/15.05; 137/240

(58) Field of Classification Search
USPC ......... 137/240, 237, 15.05, 15.04; 251/149.1, 251/146.6, 149.4
See application file for complete search history.

(56) References Cited

U.S. PATENT DOCUMENTS

| | | | | |
|---|---|---|---|---|
| 5,603,432 | A * | 2/1997 | Sardynski et al. | 137/240 |
| 7,690,392 | B1 * | 4/2010 | Sarkiss | 137/268 |
| 7,841,492 | B2 * | 11/2010 | Laible | 222/442 |
| 8,066,157 | B2 * | 11/2011 | Laible | 222/453 |

* cited by examiner

*Primary Examiner* — Kevin Lee
(74) *Attorney, Agent, or Firm* — Dennis L. Thomte; Thomte Patent Law Office LLC

(57) ABSTRACT

An apparatus for rinsing inverted chemical containers includes two main assemblies, namely a gravity flow valve assembly and a rinse adapter assembly. The gravity flow assembly is inserted into the throat of the container. The rinse adapter assembly is detachably secured to the throat of the inverted container. When the rinse adapter assembly is attached to the throat of the container, the rinse tube of the rinse adapter assembly extends upwardly through the gravity flow valve assembly and into the interior of the container. Rinsing fluid, such as water, is supplied to the rinse tube which sprays the rinsing fluid onto the interior of the container to rinse the chemical residue from the interior of the container. The apparatus may also be used to dilute the liquid chemical in the container so that the diluted chemical will more freely drain from the container.

9 Claims, 8 Drawing Sheets

APPARATUS FOR RINSING CHEMICAL CONTAINERS

BACKGROUND OF THE INVENTION

1. Field of the Invention

This invention relates to an apparatus for rinsing chemical containers and more particularly to an apparatus for rinsing chemical containers and which also may be used to dilute concentrated chemicals in the interior of the container so that the liquid chemicals will more easily drain from the container.

2. Description of the Related Art

Liquid chemicals, in a concentrated form, are frequently shipped in containers such as bottles or jugs having a shipping cap closing the throat of the container. At some time, the contents of the container are emptied into a machine or device so as to be diluted for subsequent spraying. Many of the concentrated liquid chemicals are quite thick and at least some of the liquid chemical adheres to the inside surfaces of the container upon the container being emptied. Since the container has a chemical residue adhering to the inner surfaces thereof, the container cannot be deposited in landfills or recycled. Further, the thickness of the liquid chemical makes it difficult to empty the chemical from the container.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An apparatus is disclosed for rinsing chemical containers. The apparatus may also be used to dilute the liquid chemical in the containers so that the liquid chemical may be more easily drained from the container. The apparatus includes two main components or assemblies, namely a gravity flow valve assembly and a rinse adapter assembly.

The container having liquid chemicals therein is shipped in an upright condition with a shipping cap closing the throat of the container. After the container has reached its destination for further mixing or dilution, the liquid container is inverted so that the liquid chemical therein may be drained therefrom. The lower end of the inverted container has a hollow throat extending downwardly therefrom which has interior and exterior surfaces. The exterior surface of the throat has threads formed therein. The apparatus of this invention is comprised of two main assemblies, a gravity flow valve assembly and a rinse adapter assembly.

The gravity flow valve assembly, having upper and lower ends, is positioned in the throat of the container. The gravity flow valve assembly includes a hollow cylindrical plug member having an open upper end, an open lower end, and a wall portion extending therebetween. The lower end of the plug member defines an annular valve seat. A valve, having upper and lower ends, is movably positioned within the plug member. The valve is movable between upper and lower positions. The lower end of the valve is sealably positioned in the valve seat to close the same when the valve is in the lower position. The lower end of the valve has a central opening, with upper and lower ends, formed therein. The valve includes a hollow check valve support extending upwardly from the upper end thereof. A flexible duck-bill check valve, having upper and lower ends, is also provided. The check valve is normally closed. The lower end of the check valve is supported upon the check valve support so that the check valve extends upwardly therefrom.

The gravity flow valve assembly also includes a spring having upper and lower ends with the lower end of the spring being in engagement with the valve. The upper end of the spring is in engagement with the upper end of the plug member whereby the spring yieldably maintains the valve member in sealable engagement with the valve seat. The container, when inverted, is mounted on a docking member which opens the valve to allow the contents of the container to drain therefrom. After the contents of the container have been drained therefrom, the inverted container is detached from the docking member. The rinse assembly is then attached to the throat of the container.

The rinse adapter assembly includes an upstanding, hollow tubular member having open upper and lower ends. The upstanding, hollow tubular member includes a rinse tube support at its upper end. An elongated, hollow rinse tube, having upper and lower ends, has its lower end supported by the rinse tube support so that the rinse tube extends upwardly therefrom. The rinse tube extends upwardly through the central opening in the valve, through the check valve, through the open upper end of the plug member and into the interior of the inverted container. The lower end of the rinse tube is in selective fluid communication with a source of water under pressure. The rinse tube has a spray nozzle associated therewith at its upper end. An internally threaded connector is provided at the upper end of the tubular member to enable the tubular member to be threadably attached to the throat of the container. When the tubular member has been attached to the throat of the container, the valve of the gravity flow valve assembly is in an open position.

When the liquid chemical has been drained from the inverted container, water under pressure is applied to the rinse tube so that water is sprayed onto the interior surface of the container to clean the chemical residue therefrom. The rinse water and chemical residue is drained downwardly through the open valve seat of the gravity flow valve assembly and through the tubular member of the rinse adapter assembly. The rinse adapter assembly may also be used to dilute the liquid chemical adhering in the container so that the diluted chemical may drain more easily from the container.

It is therefore a principal object of the invention to provide an improved apparatus for rinsing the interior of a liquid chemical container after the liquid chemical has been drained therefrom.

A further object of the invention is to provide an apparatus of the type described which may also be used to dilute the liquid chemical in the container so that the liquid chemical will drain more easily from the container.

A further object of the invention is to provide a means for rinsing the interior of a liquid chemical container so that the rinsed container may be placed in a landfill or recycled.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
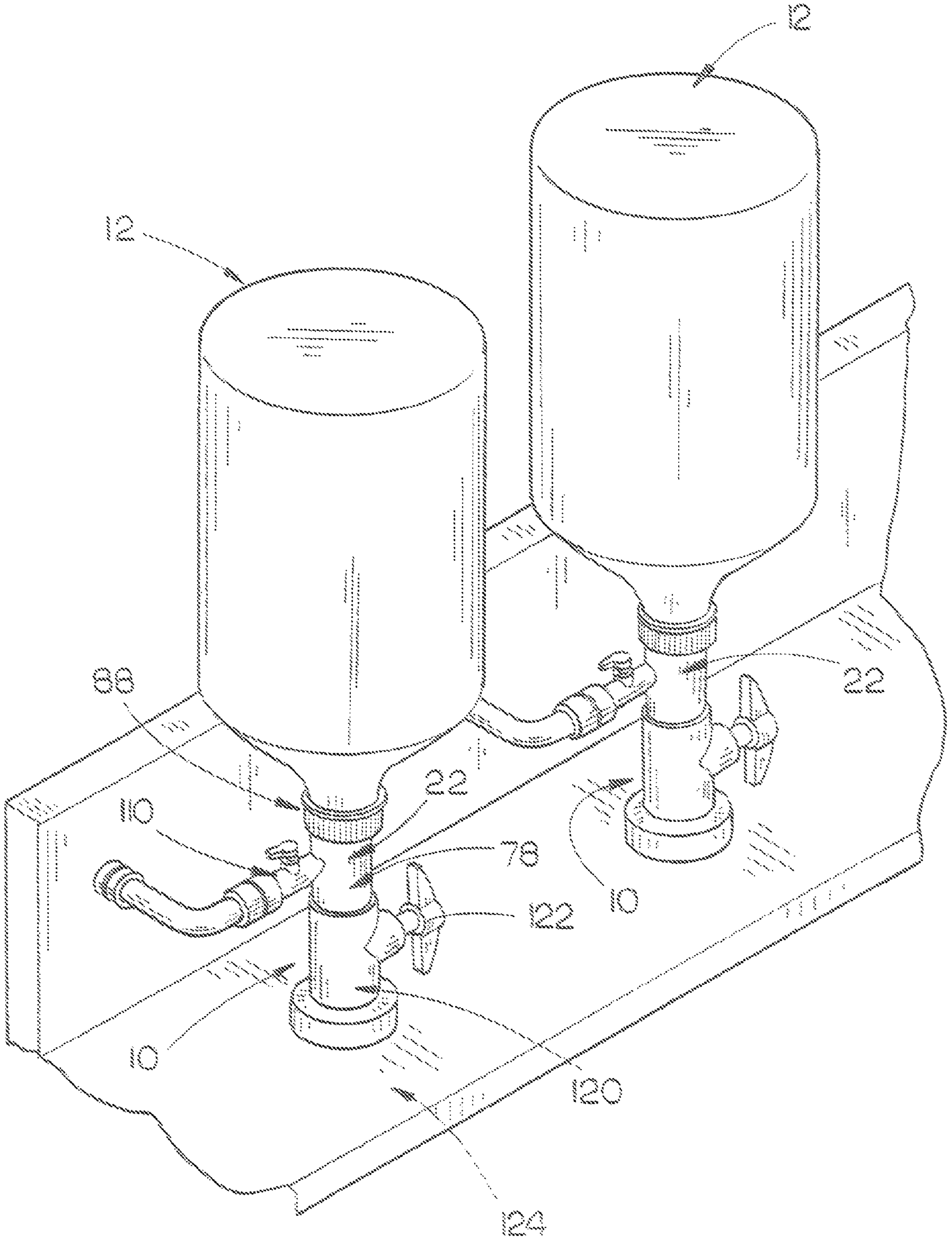
FIG. 1 is a perspective view illustrating a pair of the apparatuses of this invention being used to rinse a pair of chemical containers.
Figure 2:
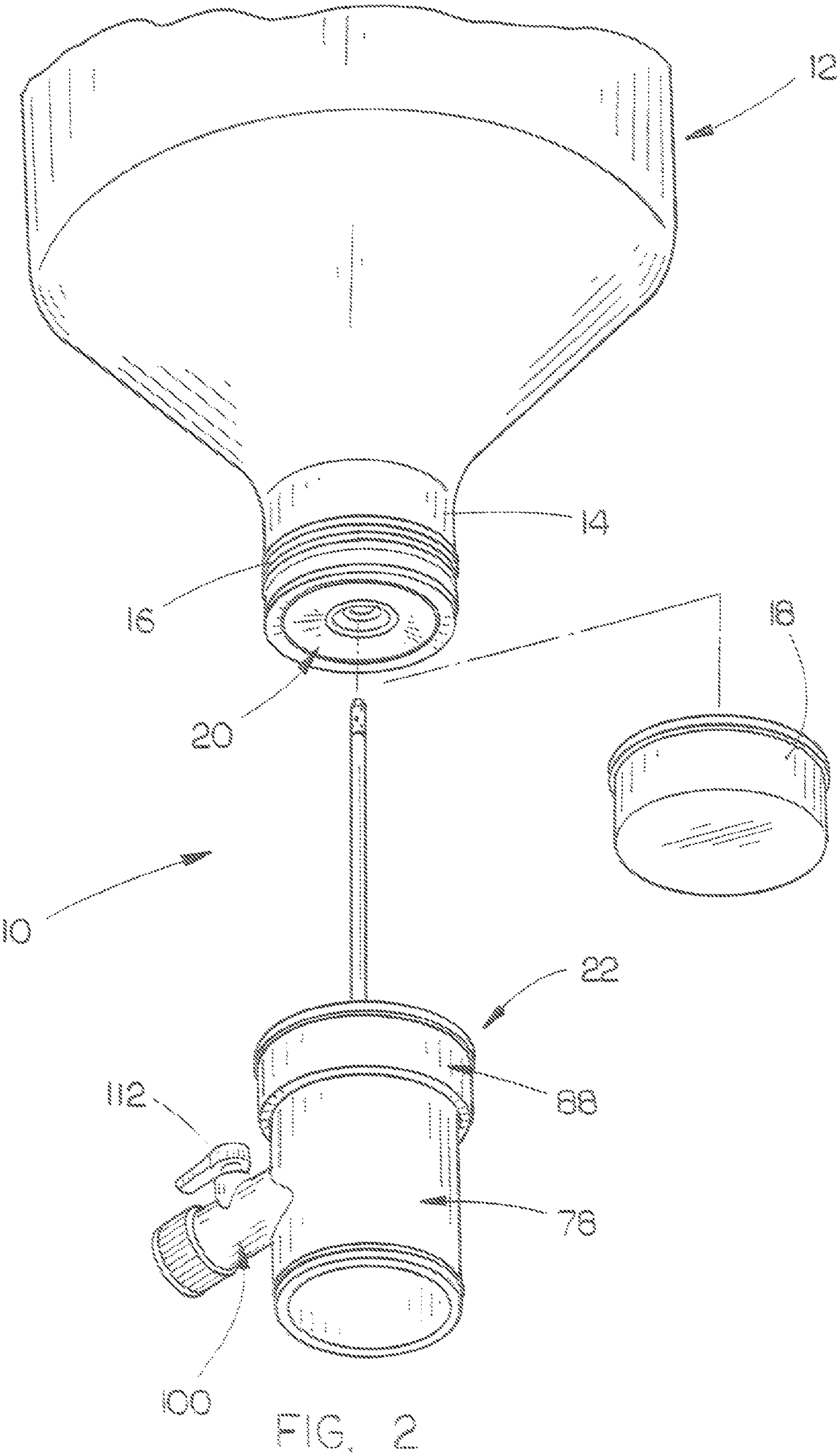
FIG. 2 is a partial exploded perspective view of the apparatus of this invention.
Figure 3:
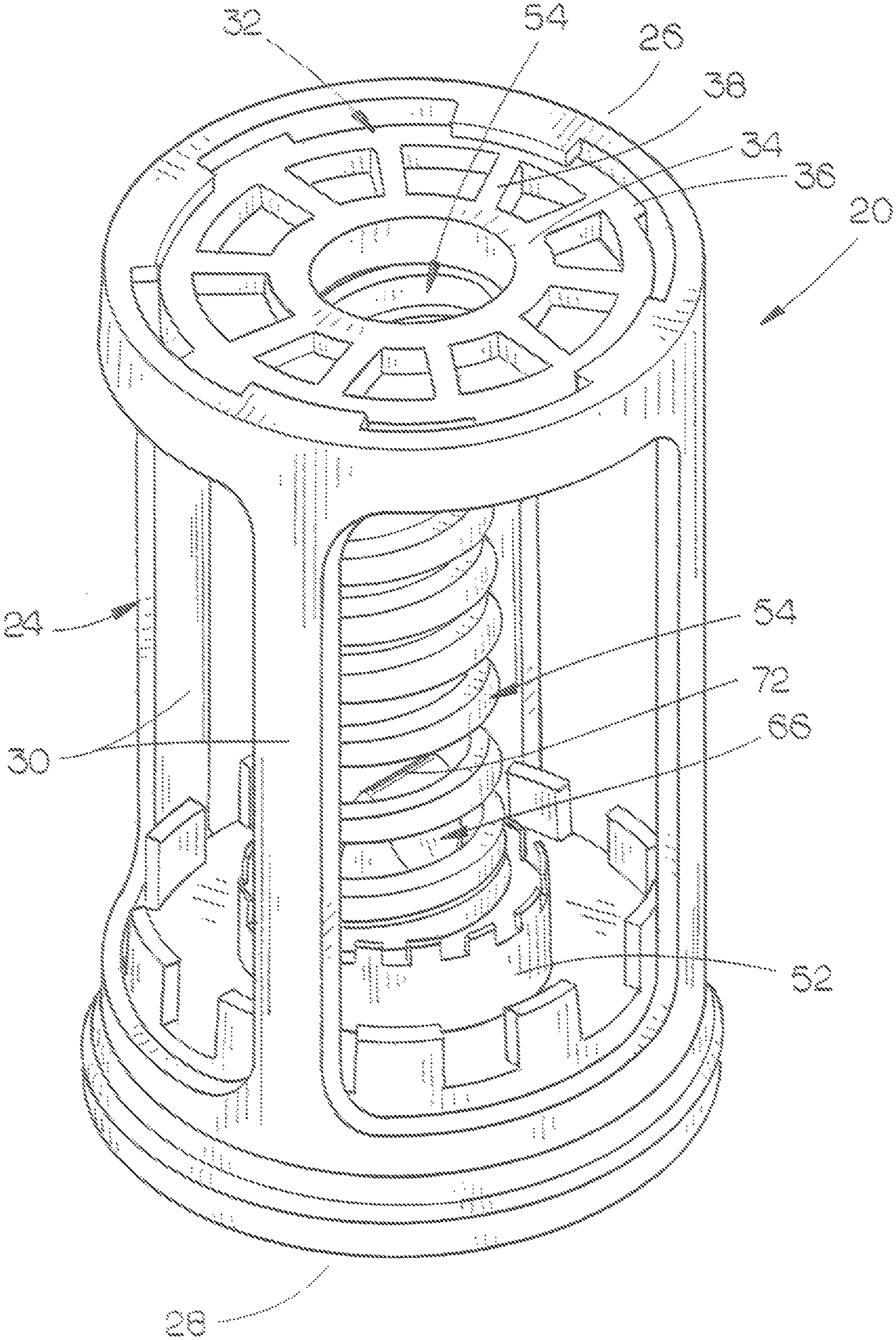
FIG. 3 is a perspective view of the gravity flow valve assembly of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to the apparatus of this invention which may be used to rinse the interior of a chemical container 12. The apparatus 10 may also be used to dilute the liquid chemical within the container 12 as will be explained in greater detail hereinafter. Container 12 includes a hollow throat portion 14 which extends therefrom and which has exterior threads 16 thereon. Container 12 will be filled with a liquid chemical while the container 12 is in an upright position. A shipping cap 18 will normally be screwed onto the threads 16 and the container 12 will normally be shipped in an upright manner. When it is desired to drain the liquid chemical from the container 12, the container 12 will be inverted as will also be explained in greater detail hereinafter. The drawings illustrate the container 12 in an inverted position.

The apparatus 10 includes two major components, namely a gravity flow valve assembly 20 and a rinse adapter assembly 22. Assembly 20 will be described as it is positioned when the container 12 is in the inverted position. Assembly 22 will be described as it is connected to assembly 20.

The gravity flow valve assembly 20 includes a plug member 24 having an upper end 26, a lower end 28 and a plurality of spaced-apart connecting members 30 extending therebetween to form a cylindrical wall portion. The open upper end 26 of plug member 24 has a disc-shaped retainer member 32 secured thereto which includes a circular support 34, an outer support 36 and ribs 38 extending therebetween. The underside of circular support 36 has an annular recess 40 formed therein.

Figure 4:
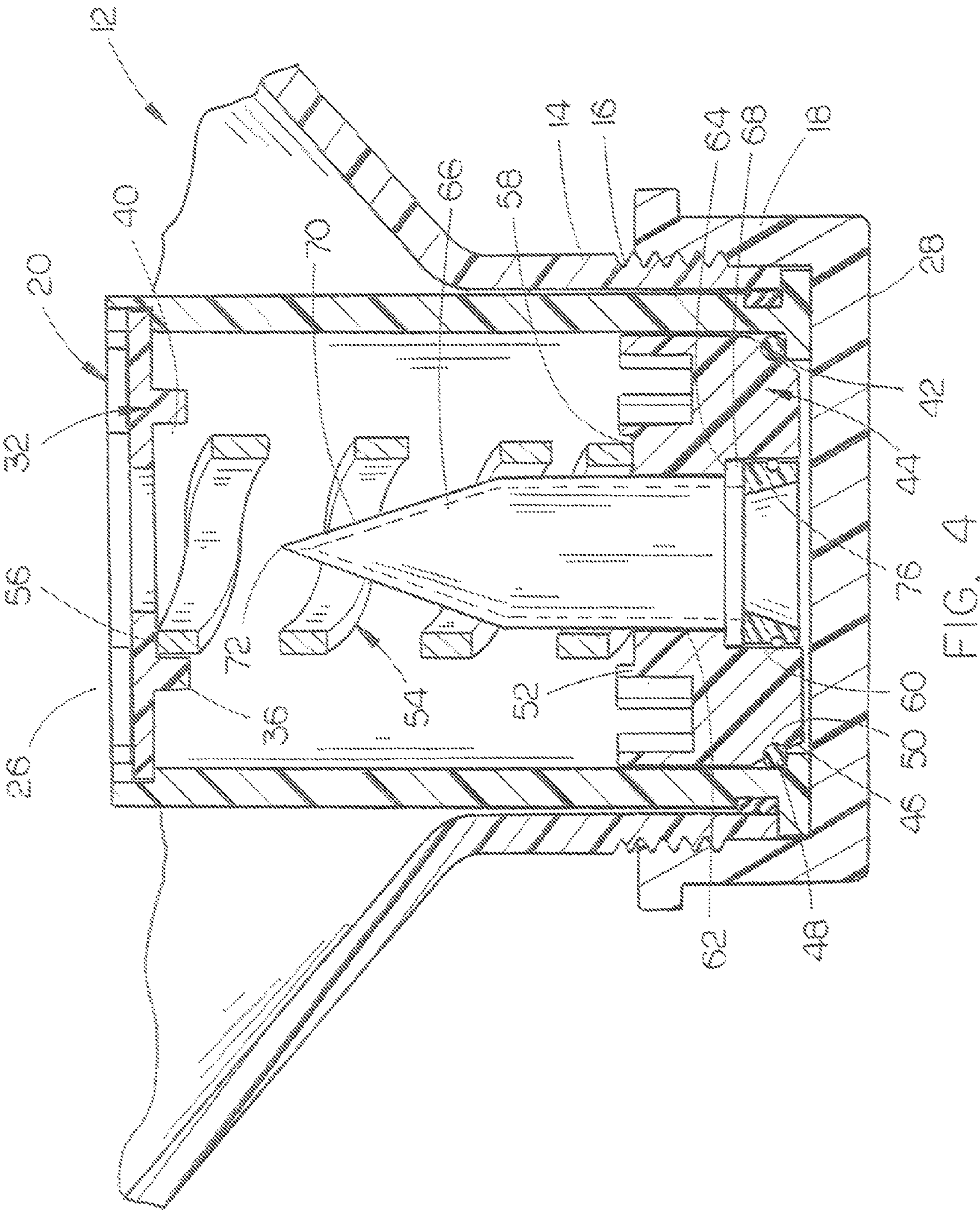
FIG. 4 is a sectional view of the gravity flow valve assembly of this invention mounted in the throat of an inverted chemical container.
Figure 5:
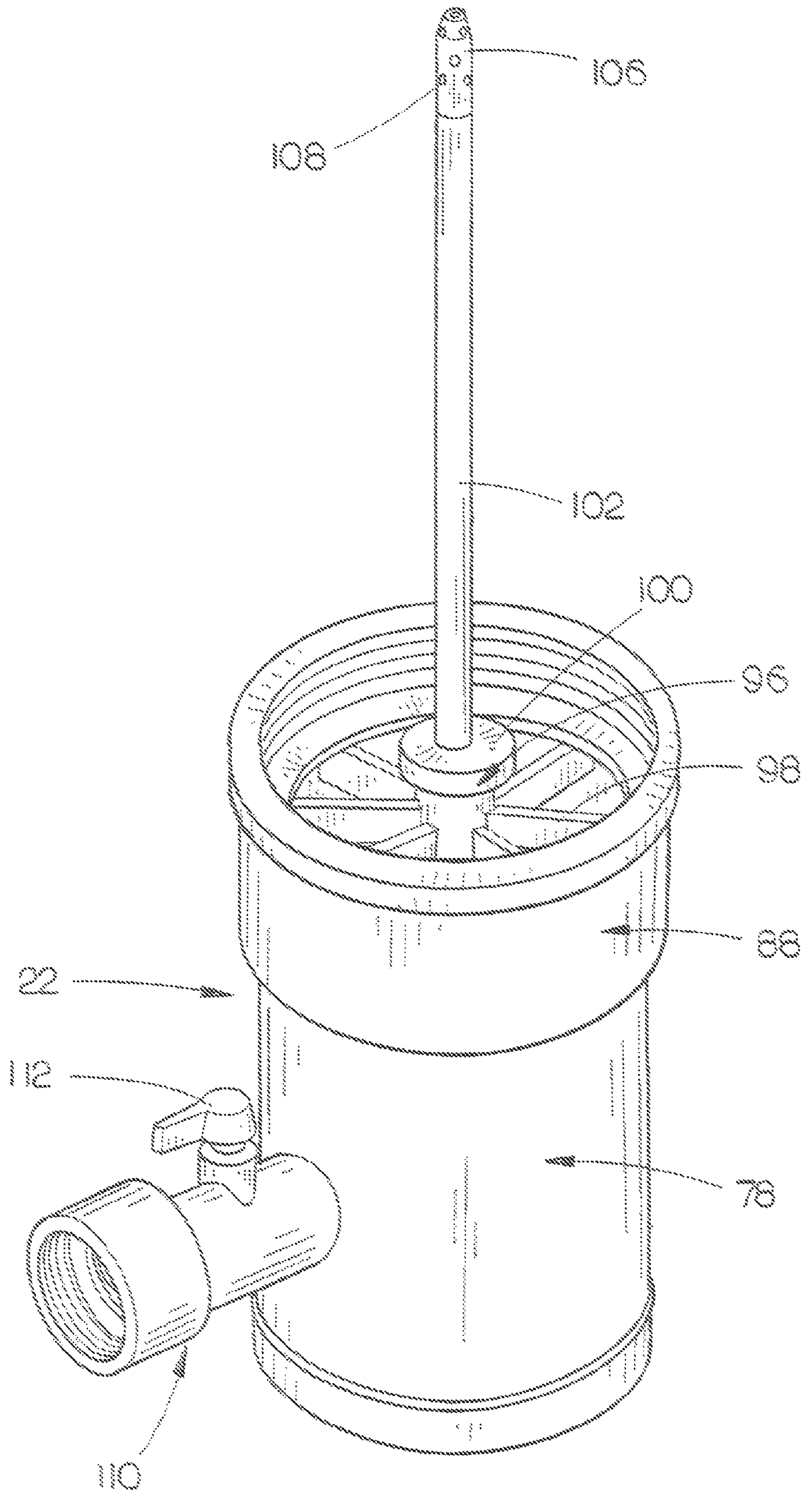
FIG. 5 is a perspective view of the rinse adapter assembly of this invention.

The lower end 28 of plug member 24 is open and defines an annular valve seat 42. A vertically movable valve 44 is positioned in plug member 24 and has a beveled lower end 46. An O-ring 48 embraces a groove 50 formed in the beveled lower end 46 as seen in FIG. 4. When the valve 44 is in its lower position, as seen in FIG. 4, O-ring 48 sealably engages valve seat 42 to close the lower open end of plug member 24. When the valve 44 is in its upper open position, the liquid in the container 12 flows into the plug member 24 between the connecting members 30 below the lower end of valve 44. As seen in FIG. 4, the upper end of valve 44 has a ring-shaped spring support 52 formed therein. The numeral 54 refers to a plastic spring 54 having an upper end 56 and a lower end 58. The upper end 56 of spring 54 is received in the recess 40 at the underside of retainer 32. The lower end 58 of spring 54 is received by the spring support 52. The spring 54 yieldably maintains valve 44 in its lower closed position so that valve seat 42 is closed.

Valve 44 has an opening 60 formed in its lower end which extends upwardly thereinto and which communicates with opening 62 formed in valve 44 so as to create a shoulder 64 therebetween. The numeral 66 refers to an elongated, flexible, hollow duck-bill check valve having an annular flange 68 at its lower end and opposing tapered portions 70 and 72, the upper ends of which have a normally closed slit 74 formed therein. Check valve 66 is positioned in openings 60 and 62, as seen in FIG. 4, so that flange 68 engages shoulder 64. As seen in FIG. 4, the upper end of check valve 66 is positioned within spring 54. A retainer 76 is positioned in opening 60 to maintain check valve 66 in position in openings 62 and 64. Thus, check valve 66 is vertically movable with valve 44.

Figure 6:
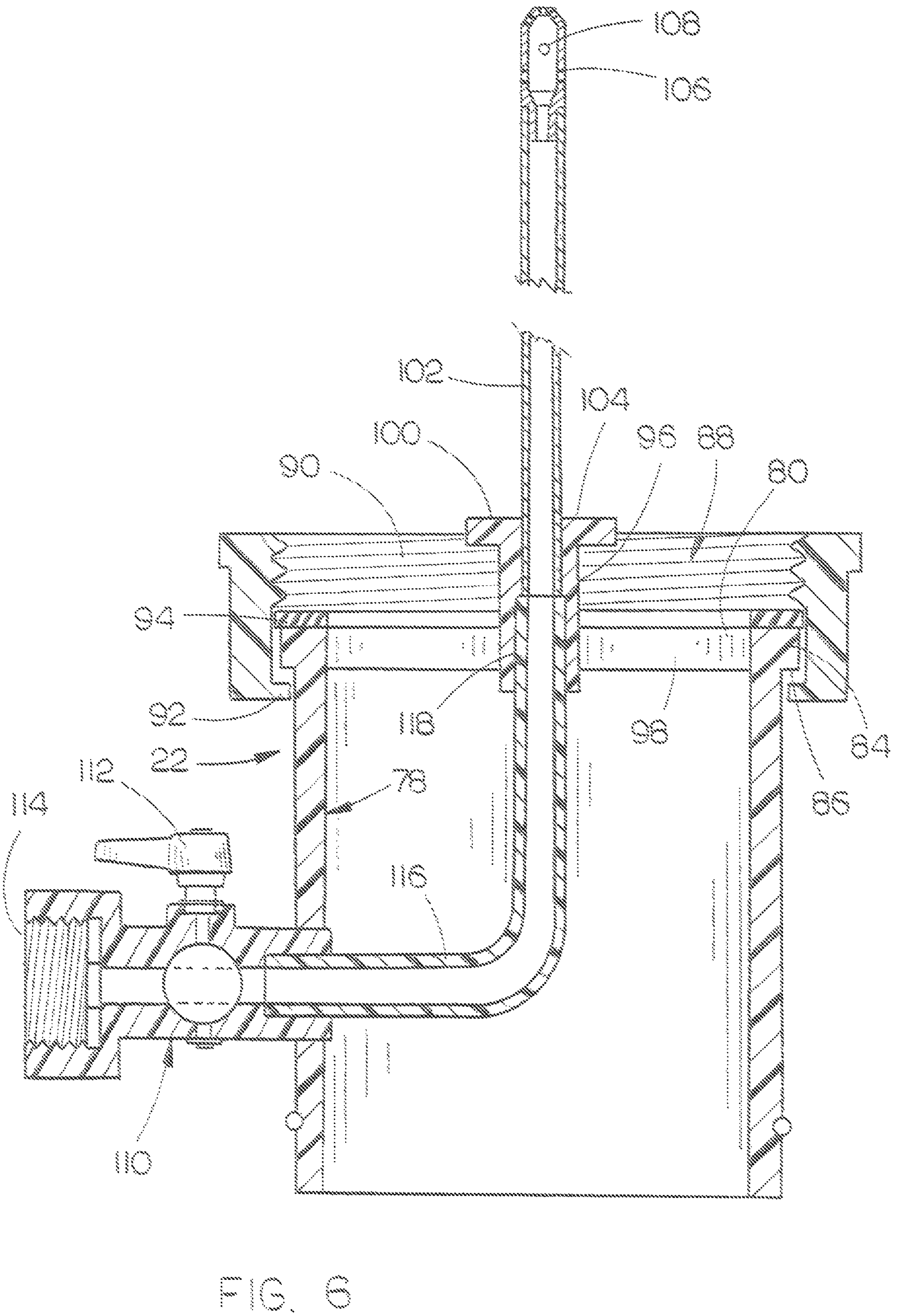
FIG. 6 is a sectional view of the spray assembly of this invention.
Figure 7:
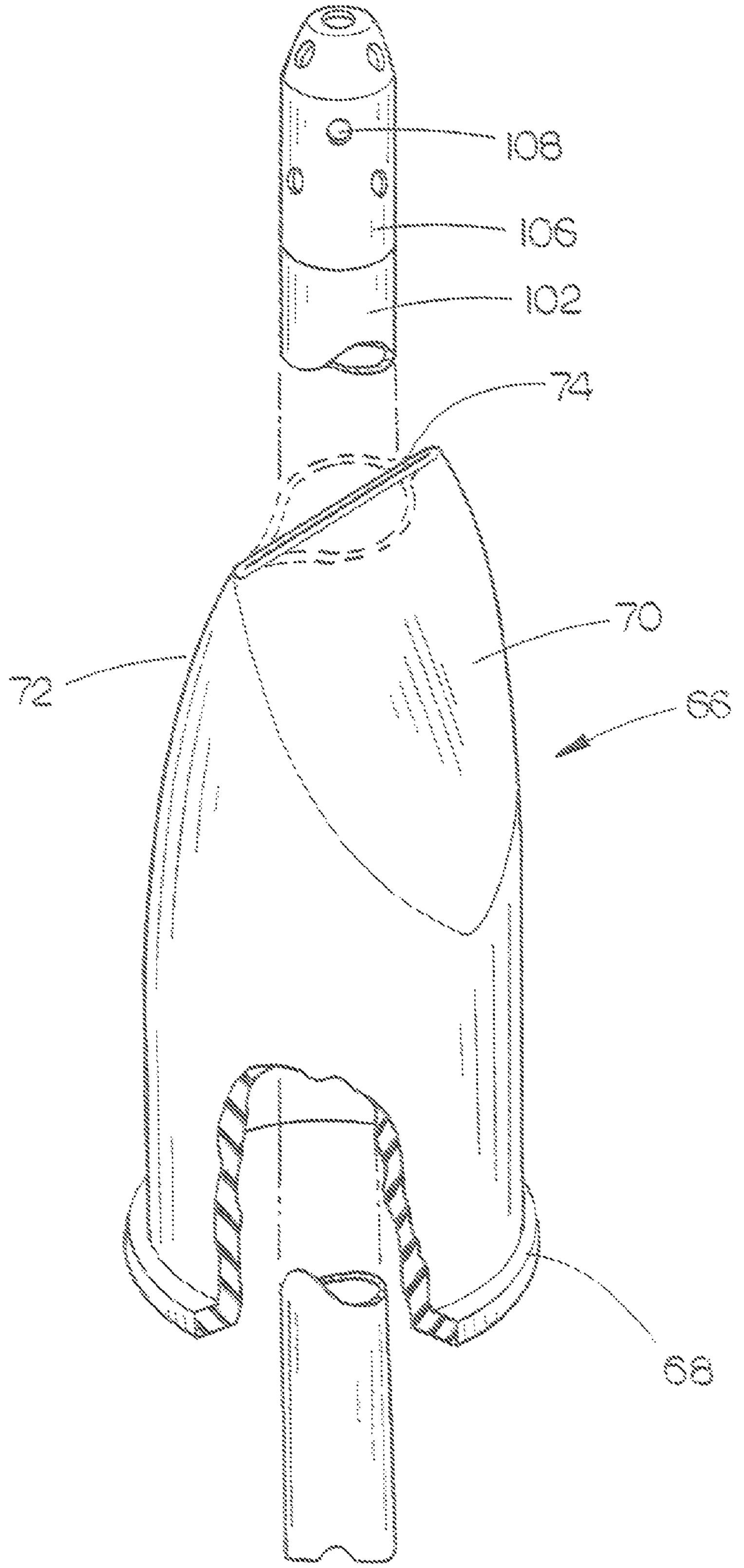
FIG. 7 is a perspective view illustrating the rinse tube of this invention extending upwardly through the duck-bill valve of the gravity flow valve assembly.
Figure 8:
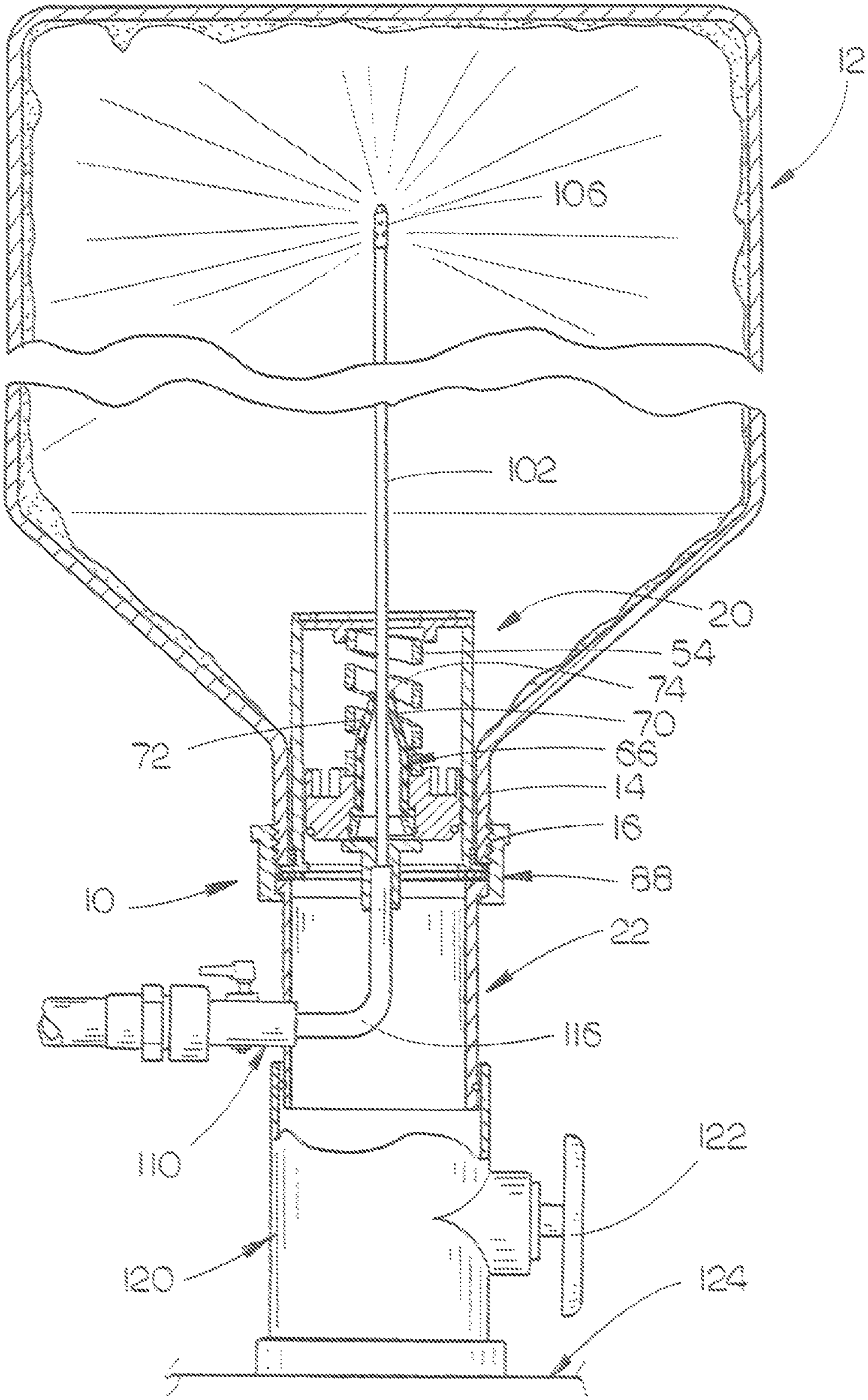
FIG. 8 is a sectional view illustrating the apparatus of this invention rinsing the interior of a chemical container.

Rinse adapter assembly 22 includes a hollow tubular member 78 having an open upper end 80 and an open lower end 82. The upper end 80 of tubular member 78 has an outwardly extending ring-shaped portion 84 which defines a shoulder 86. A ring-shaped connector 88 is rotatably mounted on the upper end 80 of tubular member 78, as seen in FIG. 6, and has internal threads 90 formed therein. The lower inner end of connector 88 has a ring-shaped lip 92 extending inwardly therefrom which will engage shoulder 86 when connector 88 is threadably secured to the threads 16 of container 12 as will be described hereinafter. An O-ring 94 is positioned on the upper end of tubular member 78, as seen in FIG. 6.

A hollow rinse tube support 96 is positioned within the upper end of tubular member 78 by a plurality of spokes 98 which extend between support 96 and the interior wall of the tubular member 78. The upper end of rinse tube support 96 has a hollow disc 100 mounted thereon. An elongated, hollow rinse tube 102 has its lower end received by opening 104 in support 96 and extends upwardly therefrom. A spray nozzle 106 is mounted on the upper end of rinse tube 102 and has a plurality of spray openings 108 formed therein. A valve fitting 110 is secured to tubular member 78, as seen in FIG. 6, and has a valve 112 positioned therein. The outer end 114 of fitting 110 is in communication with a source of water under pressure. A tube 116 extends from the inner end of fitting 110 to an opening 118 formed in support 96 so that pressurized water may be supplied to the rinse tube 102.

The numeral 120 refers to a valve fitting which may be secured to the lower end of tubular member 78 if so desired. Fitting 120 includes a valve 122. The lower end of fitting 120 may be mounted on a fixture 124 if so desired with the lower end of fitting 120 being fluidly connected to a drain or collection vessel.

To summarize somewhat, the container 12 is filled with liquid chemical while the container 12 is in the upright position. After the container 12 has been filled, the gravity flow valve assembly 20 is inserted into the throat of the container. The shipping cap 18 is then mounted on the throat of the container for shipment. When it is desired to empty the contents of the container 12, the container 12 is inverted and placed on a docking member or some other structure which engages the lower end of the valve 44 to move the valve 44 upwardly to open the valve seat 42 which permits the contents of the container to drain therefrom through the plug member 24.

When the contents of the container 12 have been drained therefrom, the container 12 is disengaged from the docking member so that valve 44 closes. The rinse adapter assembly 22 is then attached to the throat 14 of the container 12. During the attachment process, the rinse tube 102 is inserted upwardly through the retainer 76, through check valve 66 and into container 12. During this process, the disc 100 engages valve 44 to open the same. Water under pressure is then forced through the rinse tube so that the rinse water rinses the chemical residue from the interior of the container 12 with the rinse water and chemical residue draining downwardly through gravity flow valve assembly 20 and through tubular member 78 into a suitable drain or receptacle.

The rinse tube adapter assembly may also be used to dilute the chemical in the container 12 so that the diluted chemical will drain more easily from the container.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. In combination:

an inverted liquid container having upper and lower ends;

said lower end of said container having a hollow throat extending downwardly therefrom which has interior and exterior surfaces;

said exterior surface of said hollow throat having threads therein;

a gravity flow valve assembly, having upper and lower ends, positioned in said throat of said container;

said gravity flow valve assembly including a hollow cylindrical plug member having an open upper end, an open lower end, and a cylindrical wall portion extending therebetween;

said open lower end of said plug member defining an annular valve seat;

a valve, having upper and lower ends, positioned within said plug member;

said valve being movable between upper and lower positions with respect to said plug member;

said lower end of said valve being sealably positioned in said valve seat to close said valve seat when said valve is in said lower position;

said lower end of valve having a central opening, with upper and lower ends, formed therein;

a check valve having a normally closed upper end and an open lower end;

said lower end of said check valve being mounted on said valve for movement therewith;

said open lower end of said check valve being in communication with said central opening of said valve;

a spring having upper and lower ends positioned in said plug member;

said lower end of said spring being in engagement with said valve;

said upper end of said spring being in operative engagement with said plug member to yieldably urge said valve into its seating engagement with said valve seat to close the same;

a rinse adapter assembly including an upstanding, hollow tubular member having open upper and lower ends;

said upstanding, hollow tubular member including a rinse tube support at its upper end;

an elongated, hollow rinse tube having upper and lower ends;

said lower end of said rinse tube being supported by said tubular member so that said rinse tube extends upwardly therefrom;

said lower end of said rinse tube being in selective fluid communication with a source of rinsing fluid under pressure;

said rinse tube having a spray nozzle associated therewith;

an internally threaded connector at said upper end of said tubular member to enable said tubular support member to be attached to the throat of said container;

said rinse tube assembly causing said valve of said gravity flow valve assembly to move upwardly out of seating engagement with said valve seat when said tubular support member is attached to said throat of said container;

said rinse tube extending upwardly through said central opening in said valve, through said lower end of check valve and through the normally closed upper end of said check valve, through the upper end of said plug member and into the interior of said container when said tubular support member is attached to the throat of said container.

2. The combination of claim 1 wherein said check valve comprises a duck-bill valve and wherein said upper end of said check valve has a normally closed slit formed therein.

3. The combination of claim 2 wherein said check valve prevents the flow of liquid downwardly through said plug member when said valve is in its said closed position.

4. A method for diluting a liquid chemical in a chemical container having a throat extending upwardly therefrom, comprising the steps of:

providing a gravity flow valve assembly having a normally closed valve means which prevents the flow of liquid through the gravity flow assembly until the normally closed valve means is opened;

inserting the gravity flow valve assembly into the throat of the chemical container to close the throat;

inverting the chemical container so that the throat extends downwardly from the inverted chemical container;

providing a dilution adapter assembly, having an upper and a lower end, which has a dilution tube extending upwardly therefrom;

attaching the dilution adapter assembly to the throat of the inverted chemical container so that said dilution tube assembly opens said valve means in said gravity flow assembly and so that said dilution tube is positioned in the interior of the chemical container;

supplying dilution fluid to the dilution tube which sprays dilution fluid into the interior of the chemical container; and draining the diluted liquid chemical in the chemical container downwardly through the gravity flow valve assembly and through the dilution adapter assembly.

5. The method of claim 4 wherein a normally closed check valve is provided in the gravity flow valve assembly and wherein the dilution tube extends upwardly through the check valve.

6. The method of claim 4 wherein a normally closed check valve is provided in the gravity flow valve assembly and wherein the rinse tube extends upwardly through the check valve.

7. A method of rinsing a container having a throat extending upwardly therefrom, comprising the steps of:

providing a gravity flow valve assembly having a normally closed valve means which prevents the flow of liquid through the gravity flow assembly until the normally closed valve means is opened;

inserting the gravity flow valve assembly into the throat of the container to close the throat:

inverting the chemical container so that the throat extends downwardly from the inverted container;

providing a rinse adapter assembly, having an upper and a lower end, which has a rinse tube extending upwardly therefrom;

attaching the rinse adapter assembly to the throat of the inverted chemical container so that said rinse tube assembly opens said valve means in said gravity flow assembly and so that said rinse tube is positioned in the interior of the chemical container;

supplying rinsing fluid to the rinse tube which sprays rinsing fluid into the interior of the container to rinse residue from the interior of the container; and draining the rinsing fluid and residue in the container downwardly through the gravity flow assembly and through the rinse adapter assembly.

8. The method of claim 7 wherein the rinsing fluid is water.

9. The method of claim 7 wherein the container is a chemical container.

* * * * *